United States Patent
Kim et al.

(10) Patent No.: US 9,225,831 B2
(45) Date of Patent: Dec. 29, 2015

(54) MOBILE TERMINAL HAVING AUTO ANSWERING FUNCTION AND AUTO ANSWERING METHOD FOR USE IN THE MOBILE TERMINAL

(71) Applicant: LG Electronics Inc., Seoul (KR)

(72) Inventors: Kyounghwa Kim, Seoul (KR); Miyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/076,672

(22) Filed: Nov. 11, 2013

(65) Prior Publication Data
US 2014/0179281 A1 Jun. 26, 2014

(30) Foreign Application Priority Data
Dec. 24, 2012 (KR) ........................ 10-2012-0152370

(51) Int. Cl.
| | |
|---|---|
| H04M 3/42 | (2006.01) |
| H04M 3/493 | (2006.01) |
| G06F 3/16 | (2006.01) |
| H04M 1/57 | (2006.01) |
| H04M 1/64 | (2006.01) |
| H04M 1/725 | (2006.01) |
| H04M 3/533 | (2006.01) |
| G10L 25/48 | (2013.01) |

(Continued)

(52) U.S. Cl.
CPC ............ *H04M 3/4936* (2013.01); *G06F 3/167* (2013.01); *G10L 13/033* (2013.01); *G10L 15/26* (2013.01); *G10L 25/48* (2013.01); *H04M 1/57* (2013.01); *H04M 1/645* (2013.01); *H04M 1/72566* (2013.01); *H04M 1/72569* (2013.01); *H04M 1/72597* (2013.01); *H04M 3/493* (2013.01); *H04M 3/53391* (2013.01); *H04W 4/16* (2013.01); *G10L 25/15* (2013.01); *H04M 2201/40* (2013.01); *H04M 2250/74* (2013.01)

(58) Field of Classification Search
CPC .................................. H04W 4/02; H04W 4/12
USPC ........ 455/414.1, 412.1, 411, 458, 456.2, 418, 455/445, 566; 379/67.1, 88.01, 100.16, 379/88.26, 201.01
See application file for complete search history.

(56) References Cited

U.S. PATENT DOCUMENTS

| | | | |
|---|---|---|---|
| 7,474,740 B1 * | 1/2009 | Smith et al. ................. | 379/88.02 |
| 2005/0096909 A1 | 5/2005 | Bakis et al. | |

(Continued)

FOREIGN PATENT DOCUMENTS

EP 1191517 3/2002

OTHER PUBLICATIONS

European Patent Office Application Serial No. 13005311.9, Search Report dated Apr. 7, 2014, 6 pages.

(Continued)

*Primary Examiner* — Kiet Doan
(74) *Attorney, Agent, or Firm* — Lee, Hong, Degerman, Kang & Waimey

(57) ABSTRACT

A method for an auto answering function for use in a mobile terminal of a user including receiving an incoming call from a calling party, answering the incoming call when the mobile terminal is in an auto answering mode, providing a first audio output to the calling party when the calling party is identified as a target user, and receiving a first response input from the calling party after providing the first audio output. The method further includes modifying information of a first application of a plurality of applications based on the first response input, wherein the first application is identified based on content of the first response input.

15 Claims, 20 Drawing Sheets

(51) Int. Cl.
  *H04W 4/16* (2009.01)
  *G10L 13/033* (2013.01)
  *G10L 15/26* (2006.01)
  *G10L 25/15* (2013.01)

(56) References Cited

U.S. PATENT DOCUMENTS

2007/0263784 A1* 11/2007 Forrer et al. ............... 379/67.1
2009/0003580 A1   1/2009 Sharpe et al.
2010/0056114 A1*  3/2010 Roundtree et al. ......... 455/414.1
2010/0119046 A1   5/2010 Hoblit et al.
2010/0158207 A1   6/2010 Dhawan et al.
2011/0105190 A1   5/2011 Cha et al.

OTHER PUBLICATIONS

European Patent Office Application Serial No. 13005311.9, Search Report dated Aug. 8, 2014, 13 pages.

* cited by examiner

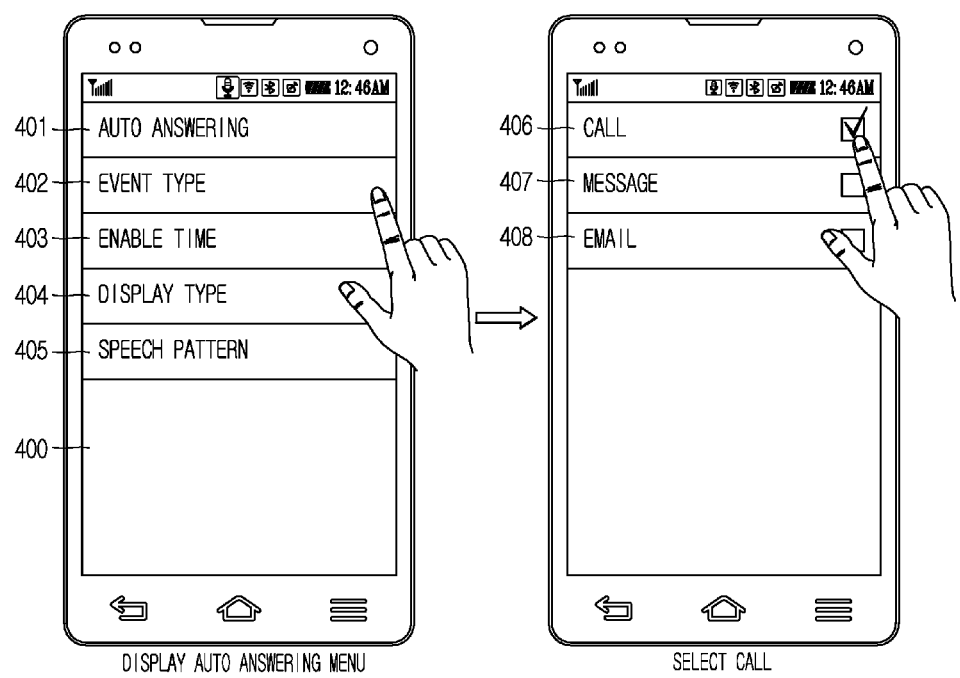

MOBILE TERMINAL HAVING AUTO ANSWERING FUNCTION AND AUTO ANSWERING METHOD FOR USE IN THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0152370, filed on Dec. 24, 2012, the contents of which is incorporated by reference herein in its entirety.

BACKGROUND OF THE DISCLOSURE

1. Field of the Disclosure

The present invention relates to a mobile terminal that is capable of naturally answering to an external event using conversation type user experience (UX) to mimic a secretary and an auto answering method for use in the mobile terminal.

2. Background of the Disclosure

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminals may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal. A touch function of the mobile terminal is configured to allow a user who is not accustomed to input buttons or keys to operate the mobile terminal conveniently. Recently, such touch functionality serves as an important function of the mobile terminal together with a user interface (UI) as well as a simple input.

Among the functions of the mobile terminal, described above, an automatic response function is a function that responds to an incoming call with voice information stored in a memory. For example, if a user cannot currently respond to the incoming call, or if a telephone conversation is not possible, such function provides the other party with a voice activated guide or answers the incoming call using voice by analyzing a question or response of the other party.

However, the automatic response function in the related art enables only a short sentence to be output in the form of voice or of letters. Therefore, the automatic response function in the related art cannot have a real time telephone conversation with the other party and conduct the call as if it were a private secretary.

SUMMARY OF THE DISCLOSURE

Therefore, an aspect of the detailed description is to provide a mobile terminal that is capable of answering an incoming call in real time while maintaining a telephone conversation with the other party and conduct the call as if it were a secretary, and an auto answering method for use in the mobile terminal.

Another aspect of the detailed description is to provide a mobile terminal that is capable of having a telephone conversation using a user's voice that is pre-set when starting an auto answering process and capable of effectively notifying the user of the content of the telephone conversation and any changed information when the auto answering process is complete.

To achieve these and other advantages and in accordance with the purpose of this specification, as embodied and broadly described herein, there is provided an auto answering method for use in a mobile terminal, including receiving an incoming call; checking an answering mode; and selectively performing auto answering for a target user using a user's speech pattern according to pre-registered auto answering information if the answering mode is set to an auto answering mode.

In the method, the auto answering information may be set from an auto answering menu or may be directly input using a user's voice.

In the method, if the auto answering mode is set, a sound canceling mode may be activated.

In the method, performing the auto answering process may include determining whether the other party is a target user for whom to apply the auto answering, using identification information or the voice of the other party, transmitting a voice guide that includes an introduction and a question associated with a matter of business if it is a target user, receiving a voice input of the other party responding to the voice guide and performing context awareness, and answering a call from the other party based on the user's schedule and any memos that are pre-set and as a result of performing context awareness.

In the method, the target user to whom to apply the auto answering may be determined using identification information and voice recognition of the other party.

In the method, the auto answering information may include an event type, the target user to whom to apply the auto answering, the time when the auto answering is to be applied, a method of displaying content of the telephone conversation, the user's speech pattern, and information on the availability to the public.

In the method, the user's speech pattern may include a vocabulary and a talking style that, after a list of telephone conversations and content of messages is analyzed for a given time, are extracted from the list.

The method may further include setting the auto answering mode, setting information for the auto answering mode, and storing the auto answering mode that is set.

The method may further include displaying the content of a telephone conversation with the other party during the auto answering on a screen in the form of letters, and storing the content and changed information and entering a sleep mode, when the auto answering is ended.

In the method, summarized versions of the content of the telephone conversation and the changed information may be stored in the form of voice and text, respectively.

The method may further include displaying the stored content of the telephone conversation and the stored changed information in the form of letters when the sleep mode is canceled and outputting the content of the telephone conversation in the form of voice when an auto answering function icon displayed on one side of the screen is selected.

In the method, when the auto answering function is set, the auto answering function icon may be displayed on a status information display region, and when the auto answering is performed and ended, the auto answering function icon may differ in color.

In the method, if the answering mode is set as the auto answering mode, a pre-stored auto answering message may be output.

There is provided a mobile terminal including a memory in which auto answering information is stored, a display unit on which content of telephone conversation is displayed during auto answering, and a controller that determines a target user to whom to apply the auto answering, based on auto answering information stored in the memory and thus perform the auto answering on the other party that is determined as the target user, in a pre-stored user's speech pattern, when receiving an incoming call.

In the mobile terminal, the auto answering information may be set from an auto answering menu or may be directly input using voice.

In the mobile terminal, if an auto answering mode is set, the controller may activate a sound canceling mode.

In the mobile terminal, the controller may transmit a voice guide that includes an introduction and a question associated with a matter of business to the target user to whom to apply auto answering, perform context awareness on the voice of the other party responding to the voice guide, and if answering is needed, check a user's schedule and memo and answer the call from the other party.

In the mobile terminal, the controller may determine the target user to whom to apply the auto answering using identification information and the voice of the other party.

In the method, the auto answering information may include an event type, the target user to whom to apply the auto answering, the time when the auto answering is to be applied, a method of displaying content of the telephone conversation, the user's speech pattern, and information on the availability to the public.

In the mobile terminal, the user's speech pattern may include a vocabulary and a speaking style (e.g., polite, lively and intellectual, and winsome styles) that, after a list of telephone conversations and content of messages are analyzed for a given time, are extracted from the list.

In the mobile terminal, the controller may store an auto answering mode that is set by a user and information for the auto answering mode in the memory.

In the mobile terminal, the controller may display content of the telephone conversation with the other party during the auto answering on a screen in the form of letters, and when the auto answering is complete, store versions of the content of the telephone conversation and changed information in the form of voice and text, respectively, in the memory.

In the mobile terminal, summarized versions of the content of the telephone conversation and changed information may be stored in the form of voice and text, respectively.

In the mobile terminal, when a user cancels a sleep mode after the auto answering is complete, the controller may display stored content of the telephone conversation and stored changed information in the form of letters and when an auto answering function icon displayed on one side of a screen is selected, output the content of the telephone conversation in the form of voice.

In the mobile terminal, when the auto answering function is set, the auto answering function icon may be displayed on a status information display region, and when the auto answering is performed and complete, the auto answering function icon may differ in color.

In the mobile terminal, if the answering mode is set as the auto answering mode, a pre-stored auto answering message may be output. Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 4A and 4B are diagrams illustrating setting the auto answering function among virtual assistance auto response functions;

DETAILED DESCRIPTION OF THE DISCLOSURE

Description will now be given in detail of the exemplary embodiments, with reference to the accompanying drawings.

Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
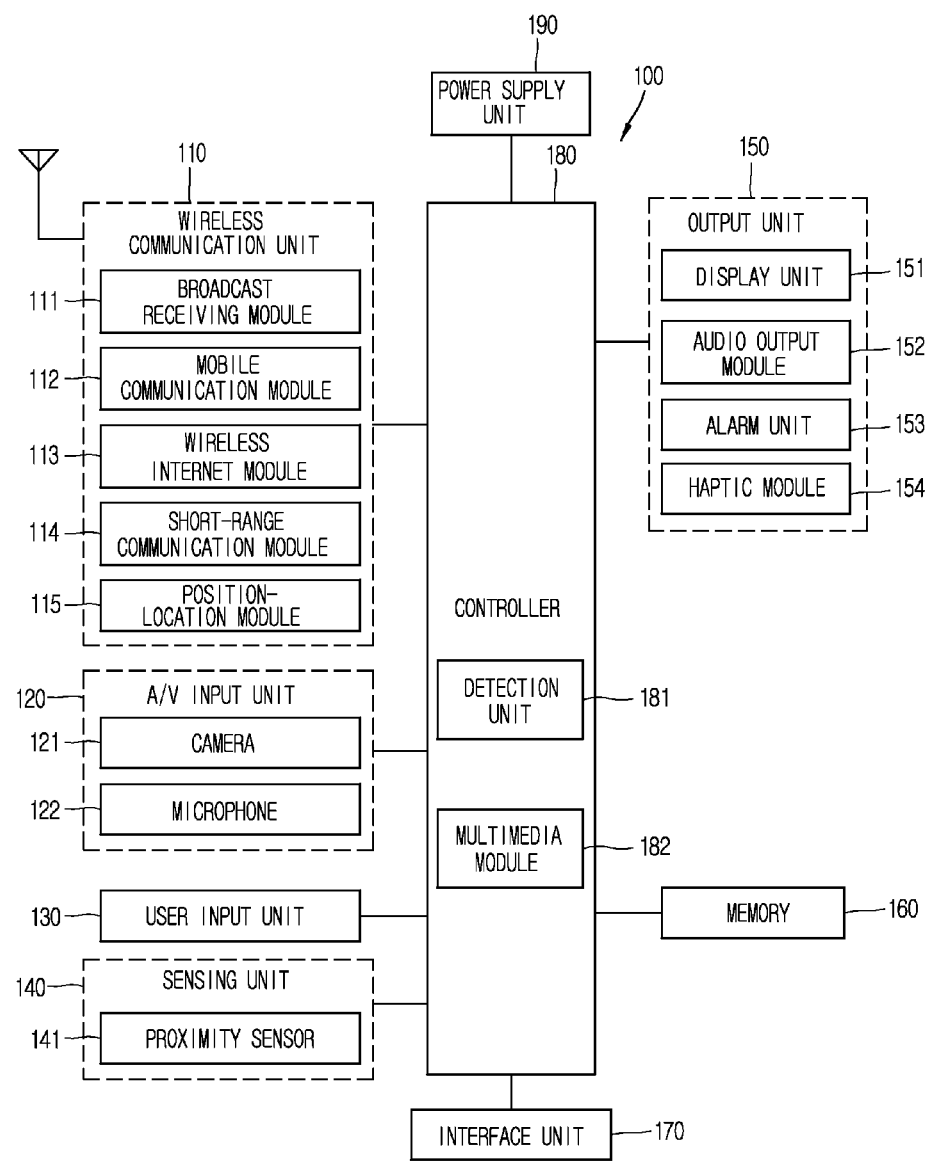
FIG. 1 is a block diagram illustrating a mobile terminal according to one embodiment of the present invention.

FIG. 1 is a block diagram of a mobile terminal in accordance with one embodiment of the present invention.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Near Field Communication (NFC) and the like. Short-range communication related modules for user account, in addition to those short-range communication modules, may employ a method proposed in the present disclosure.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141, which will be described later in relation to a touch screen.

The sensing unit 140 includes a geomagnetic sensor to calculate a moving direction when a user moves, a gyro sensor to calculate a rotating direction, and an acceleration sensor.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call.

Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. When a call signal or a message is received, the alarm unit 153 may output vibration to make a user recognize the event occurrence. Of course, the signal for notifying the event occurrence may be output through the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 182 which provides multimedia playback. The multimedia module 182 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 shown in FIG. 1 may be configured to operate within a communication system which transmits data via frames or packets, including both wireless and wireline communication systems, and satellite-based communication systems.

Figure 2:
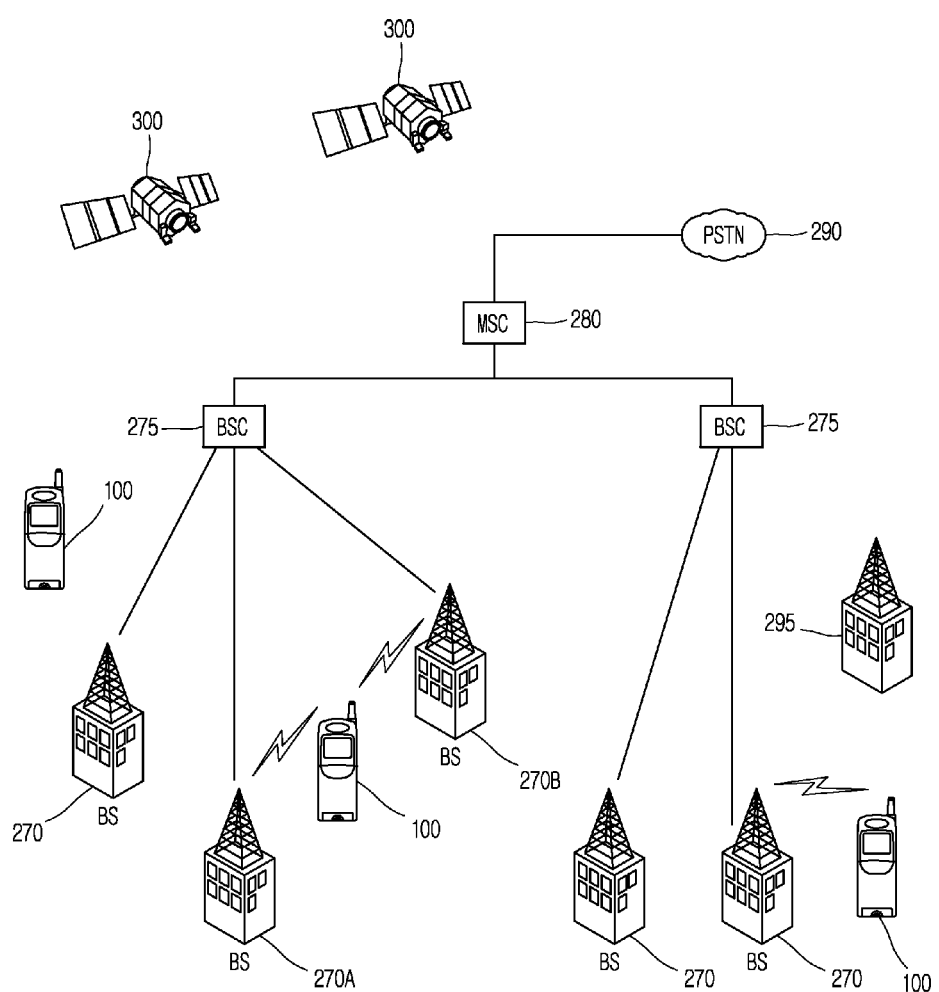
FIG. 2 is a block diagram illustrating a wireless communication system.

FIG. 2 shows a wireless communication system which is operable with the mobile terminal in accordance with the one embodiment.

As shown in FIG. 2, a wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

According to an embodiment of the present invention, when in a situation where a mobile terminal user does not respond to or answer an external event (a telephone call, an email, and an SNS message), a corresponding event occurs, the mobile terminal is equipped with a virtual assistance auto response function that enables the mobile terminal to perform a response to the event by itself.

The virtual assistance auto response is selectively set according to types of events, or by a receiver.

The virtual assistance auto response is performed in the form of voice, video, or text according to the types of events. The type of the event includes an incoming call, a message (SMS, MMS, SNS and the like), and an email.

If the virtual assistance auto response is set with respect to the incoming call (a voice telephone conversation or a video telephone conversation), the mobile terminal performs an auto answering function that has a real-time conversation while maintaining a telephone conversation with the other party.

Virtual Assistance Auto Response Using Voice Telephone Conversation Type UX

Figure 3:
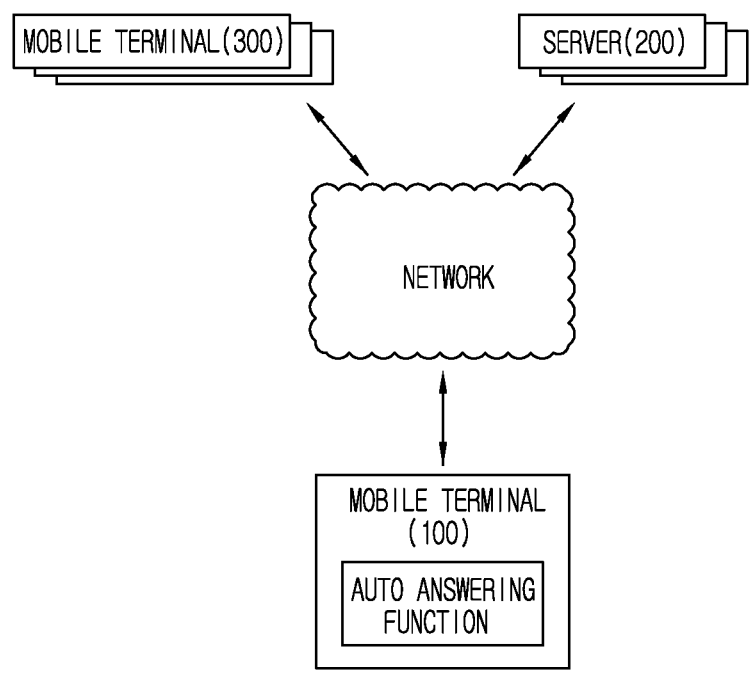
FIG. 3 is a configuration diagram illustrating an auto answering system for performing an auto answering function according to an embodiment of the present invention.

FIG. 3 is a configuration diagram illustrating an auto answering system for performing the auto answering function according to an embodiment of the present invention.

According to an embodiment, an auto answering function is provided that is among the virtual assistance auto response functions using user experience (UX) that results from developing conversation type technologies in the related art.

The virtual assistance auto response function is described as a auto answering function (mode) and is different from a conventional auto response function (mode).

The auto answering function is a function that is activated when an incoming call event occurs. The auto answering function is a new type of auto assistant that is a combination of voice recognition and verbal response.

As illustrated in FIG. 3, the auto answering function is a function wherein a mobile terminal 100 performs a real-time auto response with respect to a user of another mobile terminal 300. The mobile terminal 100 or a server 200 is equipped with the auto answering function. If the server 200 is equipped with the auto answering function, the controller 180 of the mobile terminal 100 requests the server 200 to transmit a voice of the user of the mobile terminal 300 and in order to perform context awareness.

In some embodiments, in addition to a general voice recognition function, voice print analysis technology and voice recording technology are used to perform the auto answering function.

According to an example, the voice print and the voice of the user are stored, or the voice print is analyzed based on the content of the existing voice telephone conversations, thereby mimicking the same voice as that of the actual user. This enables the other party to feel as if he/she is having the telephone conversation with the user of the mobile terminal. The voice print is a voice visualized as a pattern, like a fingerprint, which is obtained by analyzing the voice of a human being with a voice analyzer in terms of length, height, strength, and so on. The voice print differs in characteristics from person to person. Therefore, the voice print differs in resonance frequency depending on a length from a vocal cord to a lip. Because of this, it is possible to extract an age, a home town, a height, an educational background, a verbal habit, an occupation, and a cultural level from the voice print of the user. Thus, the voice print is an important factor in distinguishing among users, along with a fingerprint and a blood type. To that end, according to the an embodiment of the present invention, a voice print analysis unit is provided separately from the controller 180.

In addition, in an example, when performing the auto answering function, context awareness is used to clearly grasp an intention of the user through voice recognition during the telephone conversation.

Context awareness includes not only a method of extracting characteristics word by word or phrase by phrase from natural language speech being input and recognizing the natural language, but also an intelligence technique such as learning and inference. In FIG. 3, the mobile terminal 100 analyzes information stored in a memory to perform natural language analysis for context awareness. Alternatively, the server 200 is requested to perform the natural language analysis and send the result of the analysis to the mobile terminal 100. To that end, a natural language analysis unit is separately provided.

According to another embodiment the present invention, a voice/text conversion function, that is, a function of converting text input into voice or converting content of the telephone conversation of the other party into text, is used to perform the auto answering function. To that end, a voice/text conversion unit is provided.

According to another embodiment, when the auto answering function is activated, operations by some hardware components are limited. For example, when the auto answering function is set, an audio output module 152 and a microphone 122 are set to an OFF state. This prevents the voice of the other party from being output or prevents surrounding sound from being transmitted to the other party. In addition, the user can control options to optimize the auto answering function according to a type of event or by setting a minimum of the hardware components which may be operated.

The auto answering function is performed in such a manner as to automatically work with a personal information manager (PIM) installed on the mobile terminal 100 or a personal information manager (PIM) installed on the server (web server) 200 over a network and work with content of a memo stored in a separate region of the memory 160.

The auto answering function can detect a situation where the user cannot respond to or answer an external event (a telephone call, an email, or an SNS message), and effectively cope with the detected situation.

A situation where a telephone call cannot be responded to may include the user being at his/her desk or attending a meeting, or a situation where the user cannot not respond to the telephone call for a short period of time (such as when the user is in the rest room). Additionally, another situation may include the user being able to respond to the event, but the circumstances make it impractical or dangerous to apply an input (a touch input or a key input), such as when the user is driving behind the wheel of a vehicle. The auto answering function works with a network cloud. Data generated during the auto answering process may be stored in the memory 160, but data may also be stored in the network cloud so that another device has access to the data.

The auto answering function may be set from a user menu, and a corresponding setting status is displayed in the form of an icon on a wallpaper screen.

1. Setting of the Auto Answering Function

Figure 4B:
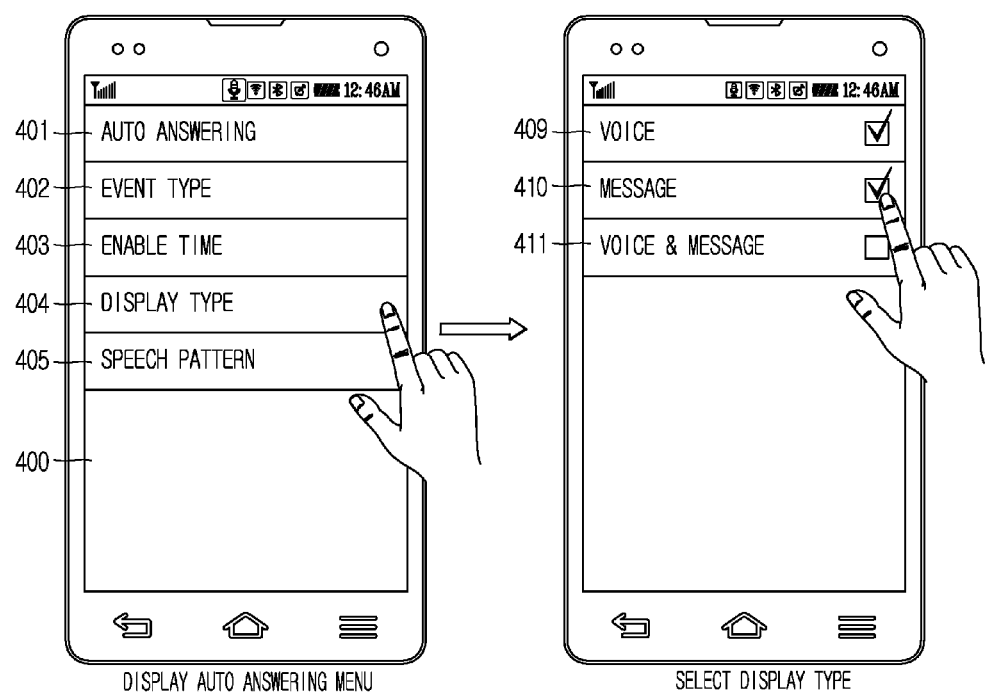

FIGS. 4A and 4B are diagrams illustrating one embodiment of setting the auto answering function among virtual assistance auto response functions.

As illustrated in FIGS. 4A and 4B, the auto answering function is set from an auto answering menu 400. When AUTO ANSWERING 401 is selected, an auto answering menu 400 appears that includes an option for EVENT TYPE 402 (for selecting the type of event, e.g., an incoming call, a message, an email, and the like), ENABLE TIME 403, DISPLAY TYPE 404 (for setting a conversation display type), and SPEECH PATTERN 405 (for setting a speech pattern in which to answer).

Selecting an event type such as a call 406, a message 407, or an email 408 for which to automatically answer may be set from selecting an EVENT TYPE 402 option. A time (hour and minute) at which to automatically answer each event is set from ENABLE TIME 403. A target user (a specific friend, family member, or other users) for whom to apply auto answering may be set from SPEECH PATTERN 405. When a target user is selected, the stored voice of the target user is automatically registered in a contact list. When the target user makes a telephone call to the mobile terminal, the voice of the target user may be automatically recognized, and auto answering may be performed.

1-1. Registration of a Target User

The auto answering process that is applied to a target user is categorized into auto answering that is applied to all users and auto answering that is applied to some users. The auto answering is set on the basis of the user, or of a group of users.

As shown in FIG. 4B, after selecting the DISPLAY TYPE 404 option, the user may select VOICE 409, MESSAGE 410, or VOICE & MESSAGE 411 as the set output for answering each event. The user may personally set his/her talking style, vocabulary, and image from a SPEECH PATTERN option (not depicted). Also, the user may set whether or not these should be made available to the public. The user's talking style and vocabulary may be obtained by analyzing a user speech pattern.

The menu configuration depicted in FIGS. 4A-4B and described above is one example, and the menu configuration and the type of display may be changed whenever necessary. For example, the menu described above is displayed in the form of a list, but when EVENT TYPE 402 is selected, the other menu items may be provided as sub-menu items in the form of a tree.

Figure 5A:
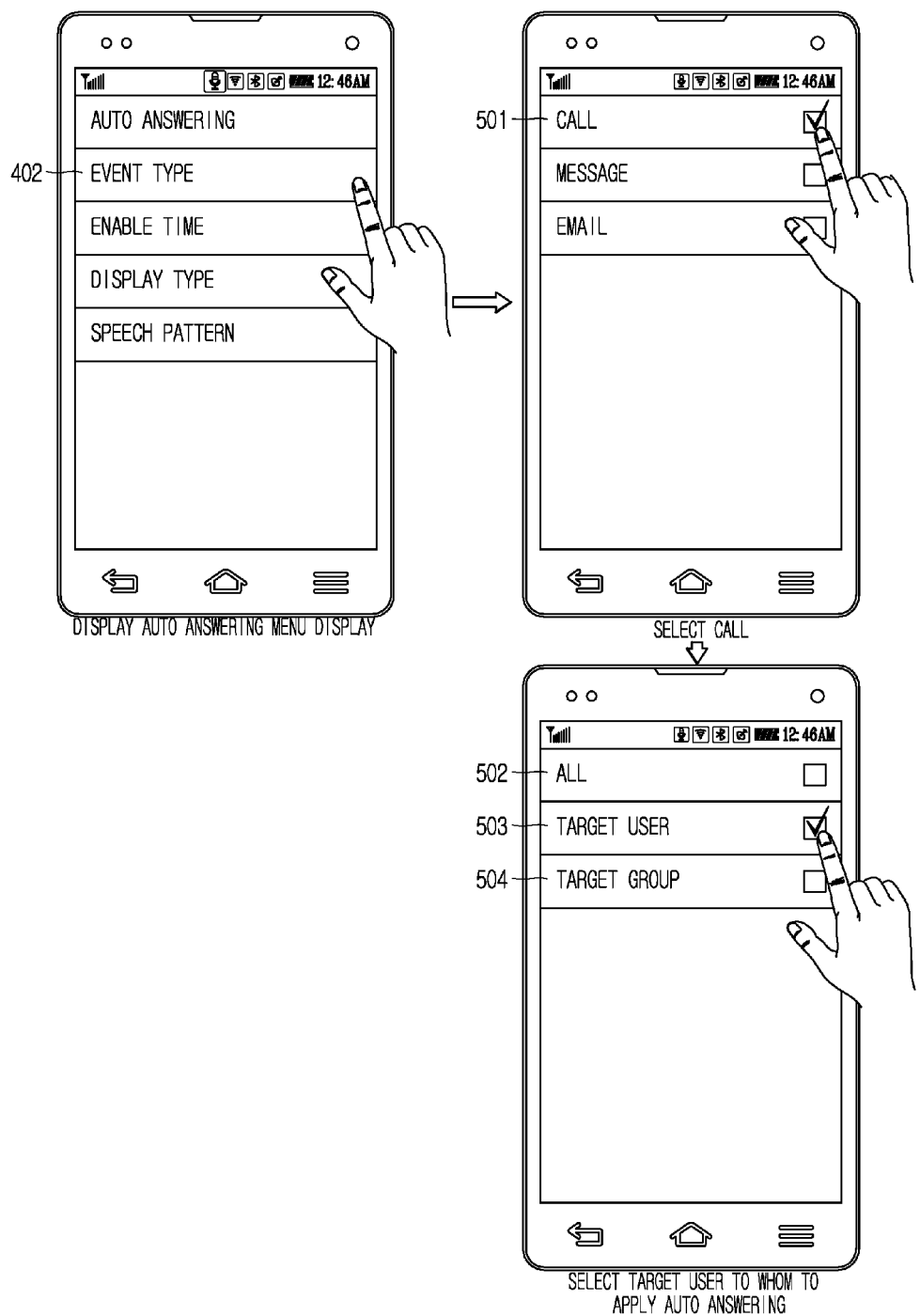
FIGS. 5A and 5B are diagrams illustrating an example of registering a target user to whom to apply the auto answering function.
Figure 5B:
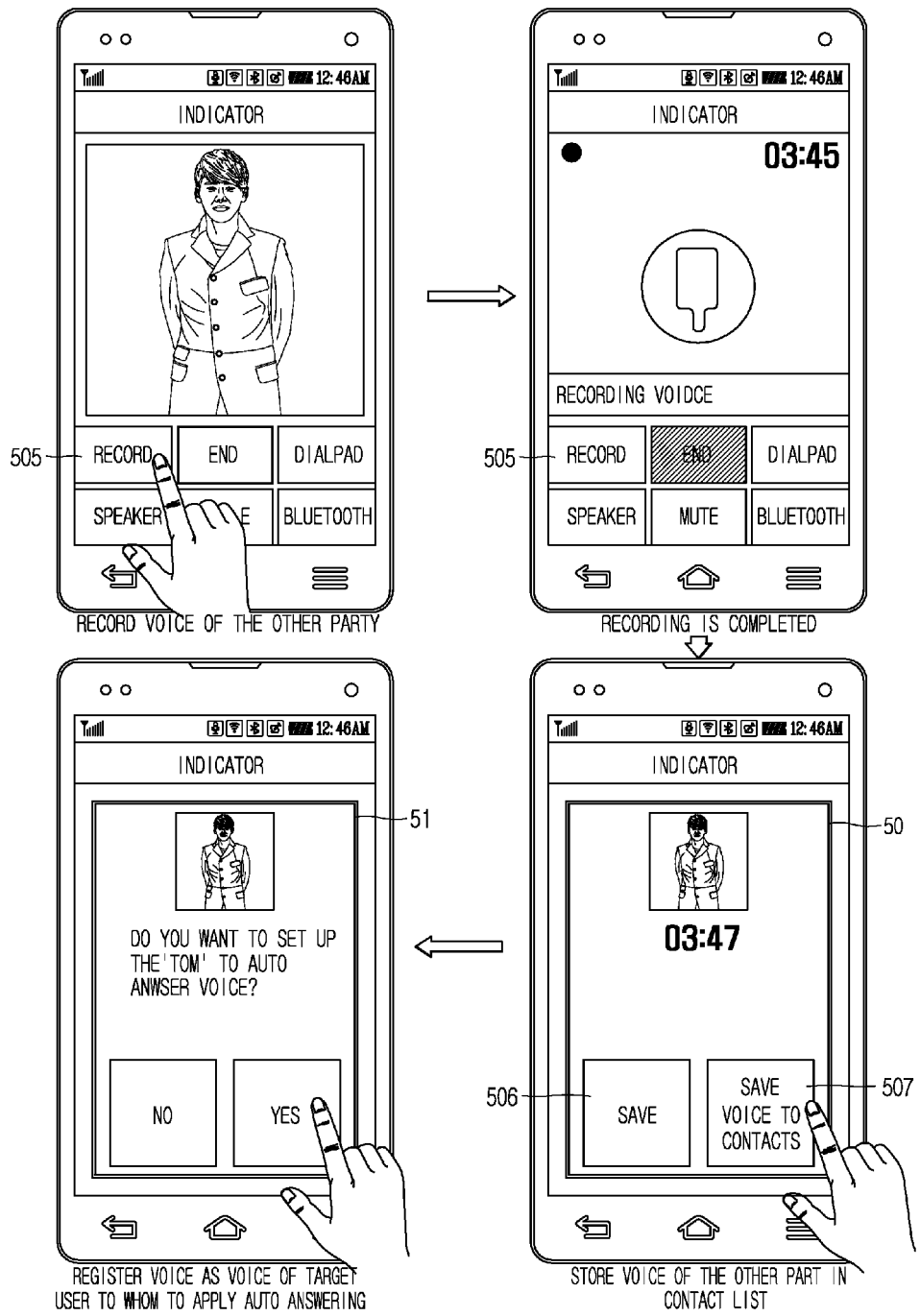

FIGS. 5A and 5B are diagrams illustrating an example in which a target user for whom to apply the auto answering function is registered.

According to an embodiment of the present invention, the auto answering function is applied to all users or only for a specific user. As illustrated in FIG. 5A, a target user for whom to apply the auto answering function may be set from EVENT TYPE 402. When the user selects a specific event (e.g., CALL 501), multiple application items from which to select are displayed. The multiple application items are grouped into ALL 502, TARGET USER 503, and TARGET GROUP 504. When TARGET USER 503 or TARGET GROUP 504 is selected, multiple users and multiple groups of users that are stored in a telephone directory are displayed. Thus the user is able to select the type of event and the target user or target group for which and for whom to apply the auto answering function.

In addition, another target user for whom to apply the auto answering function can be registered during a voice telephone conversation.

As illustrated in FIG. 5B, a user can press a record button labeled RECORD 505 during a telephone conversation (or video telephone conference conversation) with another party in order to record a voice of the other party. The recording of the voice is done within a pre-set short period of time.

When the recording of the voice of the other party is complete, the controller 180 alerts the user that the recording of the voice has ended and provides the user with an option of storing the voice of the other party through a pop-up window 50. In a case of a video telephone conversation, a button is displayed by which a storing type is selected, by selecting a SAVE 506 option for storing the voice and video in a folder, or by selecting a SAVE VOICE TO CONTACTS 507 option for storing the voice to a contact list along with the recording time and identification information of the other party (such as a photograph or an icon). When the user selects the SAVE VOICE TO CONTACTS 507 option, a pop-up window 51 is displayed that requests the user to determine whether or not the voice of the other party should be registered as a target user for whom to apply the auto answering function.

When the user confirms, the voice of the other party is stored in the contact list and at the same time, is registered as a voice of a target user for whom to apply the auto answering function. Thus, when a telephone call arrives from the registered other party, personal information on the registered other user which is associated with the registered voice is displayed on the screen, and at the same time, the auto answering function is performed.

In some embodiments, setting target users or groups of target users according to a type of event as illustrated in FIG. 5A is mainly provided in a case where the target user information (the telephone number, the email, and the voice) already registered and stored in the telephone directory. Setting a target user as illustrated in FIG. 5B is mainly provided in a case where the information on the corresponding other party is not already registered and stored in the telephone directory.

1-2. Registration of a Speech Pattern

Figure 6:
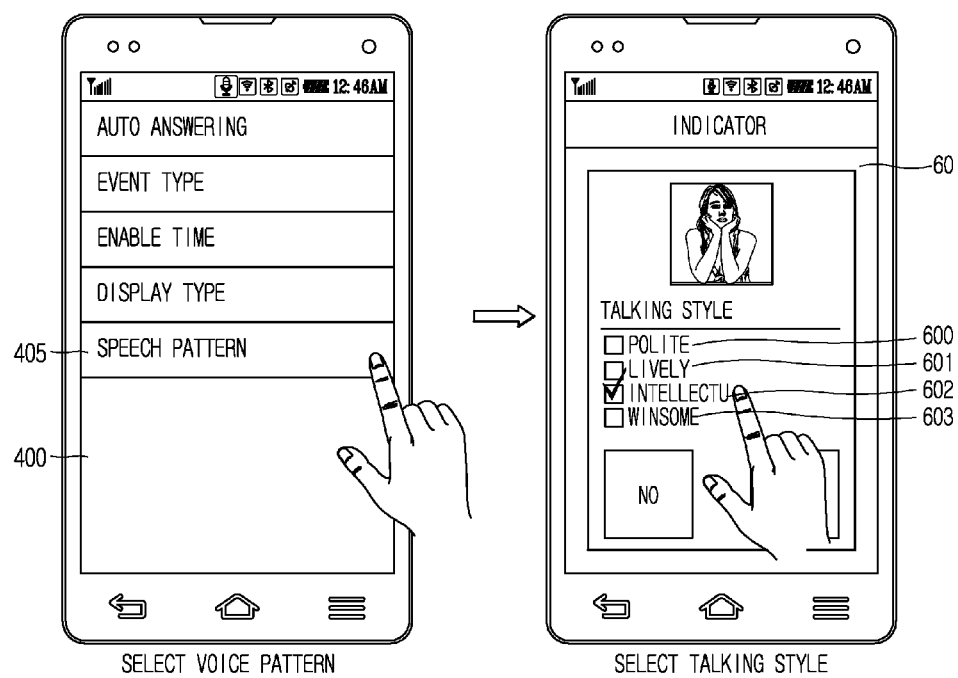
FIG. 6 is a diagram illustrating an example in which a speech pattern is registered according to one embodiment.

FIG. 6 is a diagram illustrating an example in which a speech pattern is registered according to one embodiment.

As illustrated in FIG. 6, when the user selects a SPEECH PATTERN 405 option from the auto answering menu 400, a pop-up window 60 is displayed through which the user's desired talking style is set. Various option items (e.g., POLITE 600, LIVELY 601, INTELLECTUAL 602, and WINSOME 603, etc.) may be displayed on a pop-up window 60. The user selects his/her desired talking style with which to perform the automatic answering function.

Figure 7:
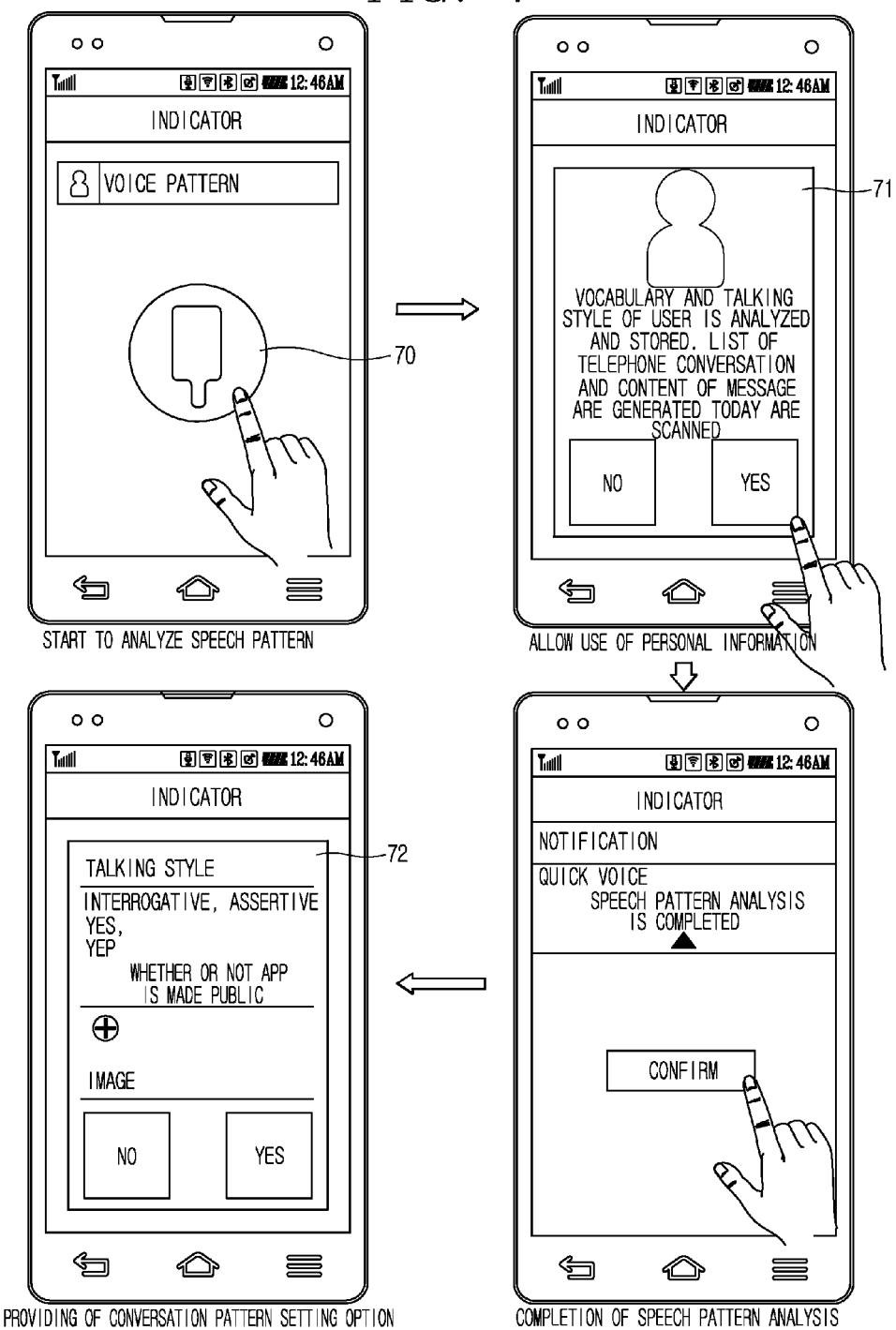
FIG. 7 is a diagram illustrating an example in which a speech pattern is registered according to another embodiment.

FIG. 7 is a diagram illustrating an example in which the user speech pattern is registered according to another embodiment.

The user's talking style is set from a SPEECH PATTERN menu option. However, because the user's talking style and vocabulary may change little by little over time, there is a need to set them by taking into consideration the telephone conversation habits and tendencies of the user.

Referring to FIG. 7, when a long touch is applied to a SPEECH PATTERN menu option, speech pattern detection items such as vocabulary, talking style, speed, and detection time are displayed (not depicted) and selectable by the user. After the desired speech pattern detection items are input, a recording icon 70 may be displayed. When the recording icon 70 is selected, approval of the use of personal information for analyzing the user's speech pattern detection items such as talking style and vocabulary is required through a pop-up window 71. When the user selects YES, the controller 180 scans the content of previous telephone conversations and previously used words and phrases for a pre-set time and performs a speech pattern analysis process to detect and analyze the speech pattern detection items.

Once the speech pattern analysis is completed, the user is notified of the results. When the user selects CONFIRM to acknowledge the completion of the pattern analysis, the detected speech pattern detection items such as vocabulary and talking style are displayed and at the same time, a pop-up window 72 may be provided. The user may be presented with an option of setting whether or not the results of the analysis, including the talking style, an associated image, and the application are made available to the public is displayed on the pop-up window 72.

The associated image may be an image that the user sets using his/her image (photograph or character) to be associated with the talking style from the pop-up window 72. Furthermore, the user may selectively set the application that he/she wants to make available to the public.

Figure 8A:
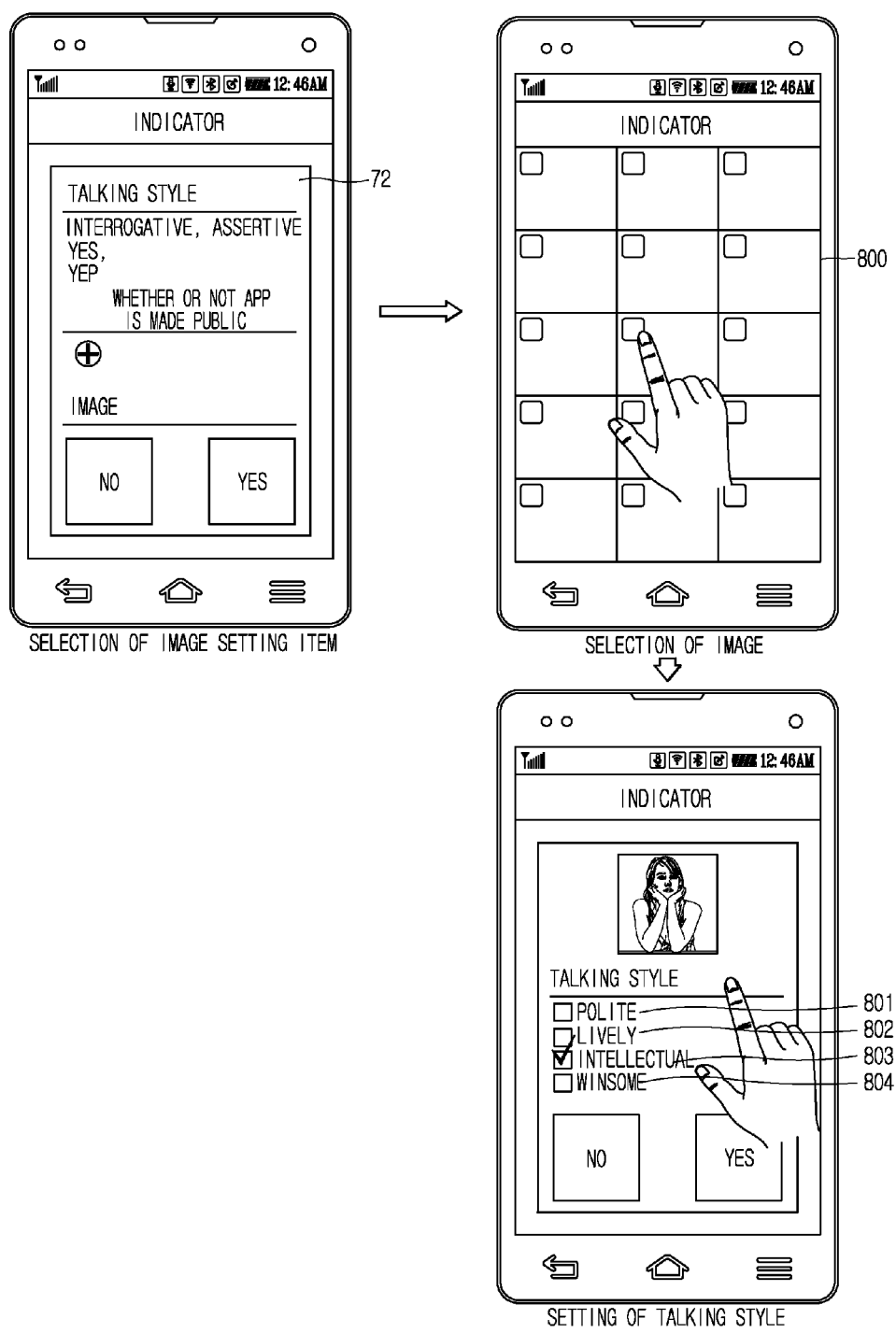
FIGS. 8A and 8B are diagrams illustrating an operation of setting various options on the basis of a speech pattern analysis.
Figure 8B:
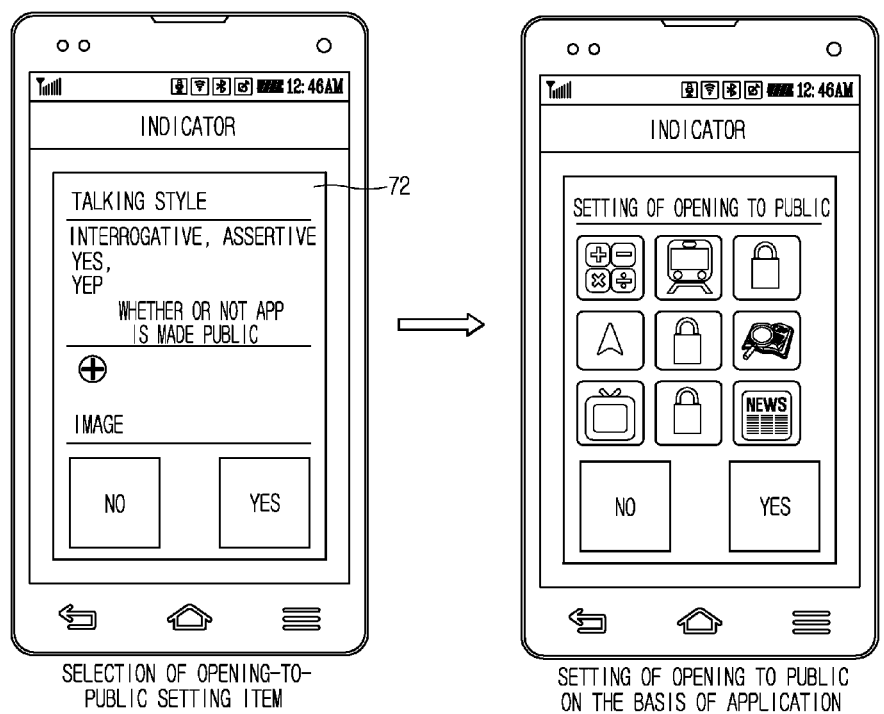

FIGS. 8A and 8B are diagrams illustrating an operation of setting various options based on the result of the speech pattern analysis.

As illustrated in FIG. 8A, when the user chooses to set an image to be associated with a talking style, the user may select an image item from the pop-up window 72. The controller 180 displays multiple user images (photographs and characters) in a displayed gallery of images 800. The user may set the photograph or the character to be used in the auto answering process from among the displayed multiple images. Once the image is registered, the user may select a talking style item from among talking style options such as POLITE 801, LIVELY 802, INTELLECTUAL 803, and WINSOME 804. The information associated with the selected talking style is stored in the contact list.

In addition, the user speech pattern and speech pattern detection items can be set as available to the public or as being private with respect to a specific application. To that end, as illustrated in FIG. 8B, the user can select an option from the pop-up window 72 to set information related to the user's speech pattern as being made public or as being made private with respect to specific applications stored and executed on the mobile device.

Figure 9:
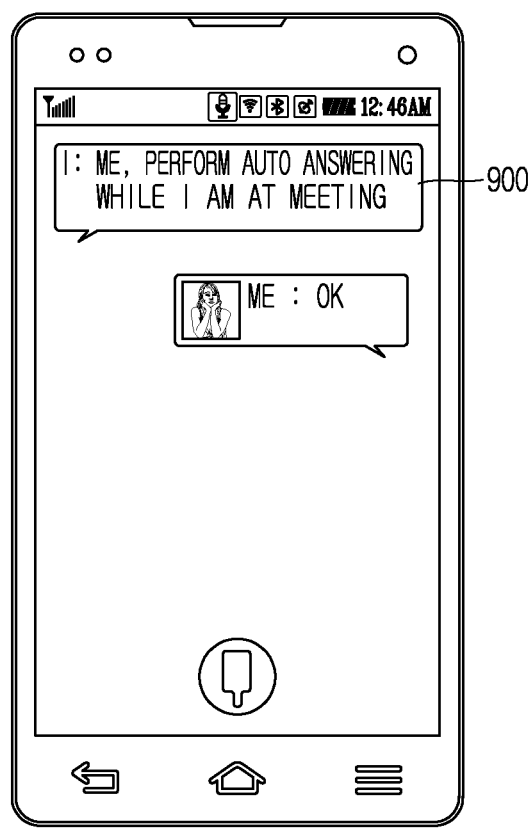
FIG. 9 is a diagram illustrating an example in which the auto answering function according to another embodiment of the present invention is set using voice.

FIG. 9 is a diagram illustrating an example in which the auto answering function according to another embodiment of the present invention is set using voice commands.

As illustrated in FIG. 9, the user can personally set the auto answering function using voice commands 900. In this case, the controller 180 automatically provides the detailed information necessary for the auto answering function (the event type, the target user, the speech pattern, and the associated information) and additionally enables the user to set the necessary information. In addition, according to another embodiment of the present invention, when the auto answering function is set using voice commands 900, an incoming call (a priority event) is automatically set as the event type and the other information options are set to default values.

1-3. Completion Display of Auto Answering Function Setting

Figure 10:
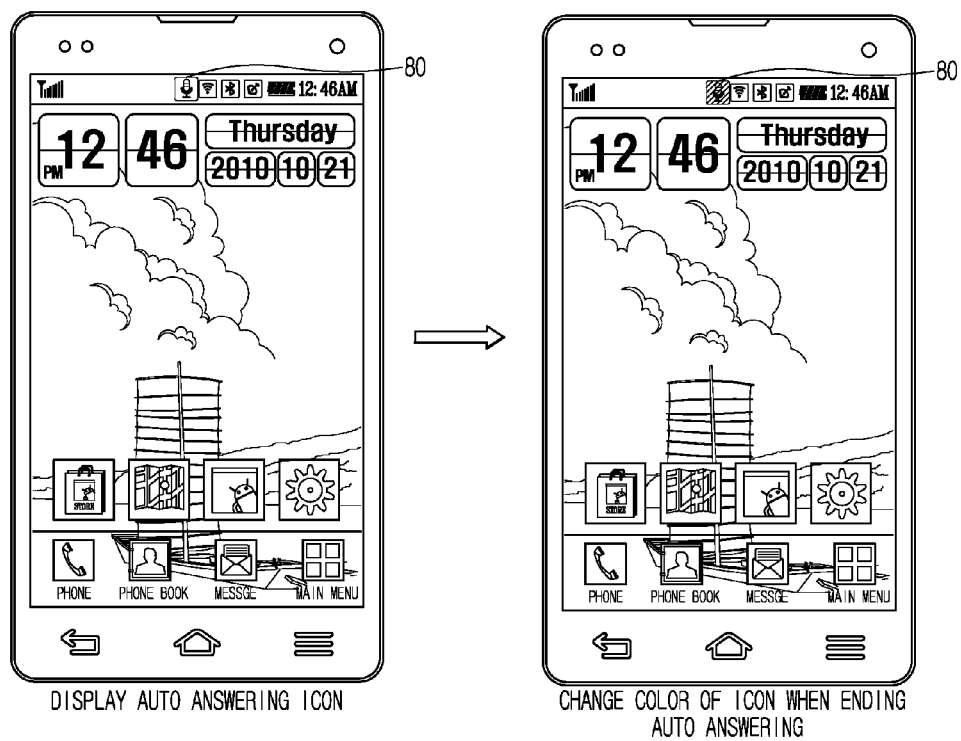
FIG. 10 is a diagram illustrating a screen display that appears when the setting of the auto answering function is completed.

FIG. 10 is a diagram illustrating a screen display that appears when the auto answering function is set.

When the auto answering function is set as illustrated in FIG. 10, an icon 80 indicating that the auto answering function is currently set is displayed on a region on which status information is typically displayed. When the auto answering process is completed, the icon 80 changes in color and notifies the user that an auto answering process has taken place and is complete.

Therefore, if the icon 80 changes in color, the user selects the corresponding icon to review and listen to the content of the conversation resulting from the auto answering process, which took place between the mobile terminal and the other party. Alternatively, the user may check the content of the conversation by reading messages in text. When the mobile terminal is powered on or wakes from a sleep mode, the content of the conversion is displayed in the form of a message and the content of the conversation may be output in the form of voice when the icon 80 is pressed.

1-4. Entering an Auto Answering Mode

Figure 11:
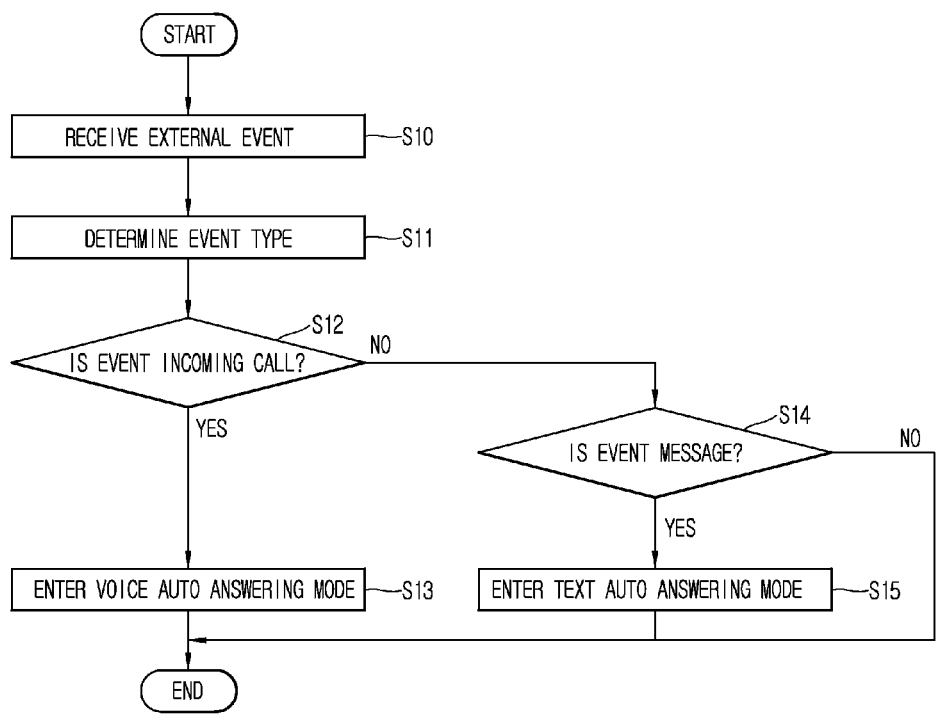
FIG. 11 is a flowchart illustrating an operation of entering an auto answering mode depending on an event type according to an embodiment of the present invention.

FIG. 11 is a flowchart illustrating an operation of entering an auto answering mode depending on the event type according to another embodiment.

As illustrated in FIG. 11, when an external event is received (S10), the controller 180 determines a type of the external event (S11 to S12). When the type is an incoming call, the controller 180 enters a voice auto answering mode to perform the auto answering process (S13). When the type is a message (S14) such as an SMS message, an MMS message, or an SNS message, the controller 180 enters a text auto answering mode to perform the auto answering process (S15).

If the event is an SMS message or an MMS message, a pre-stored response message is transmitted through a wireless communication unit 110. If the event is an SNS message, a similar process as compared with the voice auto answering process is performed except with messages in the form of text instead of voice communication, and thus the messages in the form of text are transmitted to and from the other party during the auto answering process.

Figure 12:
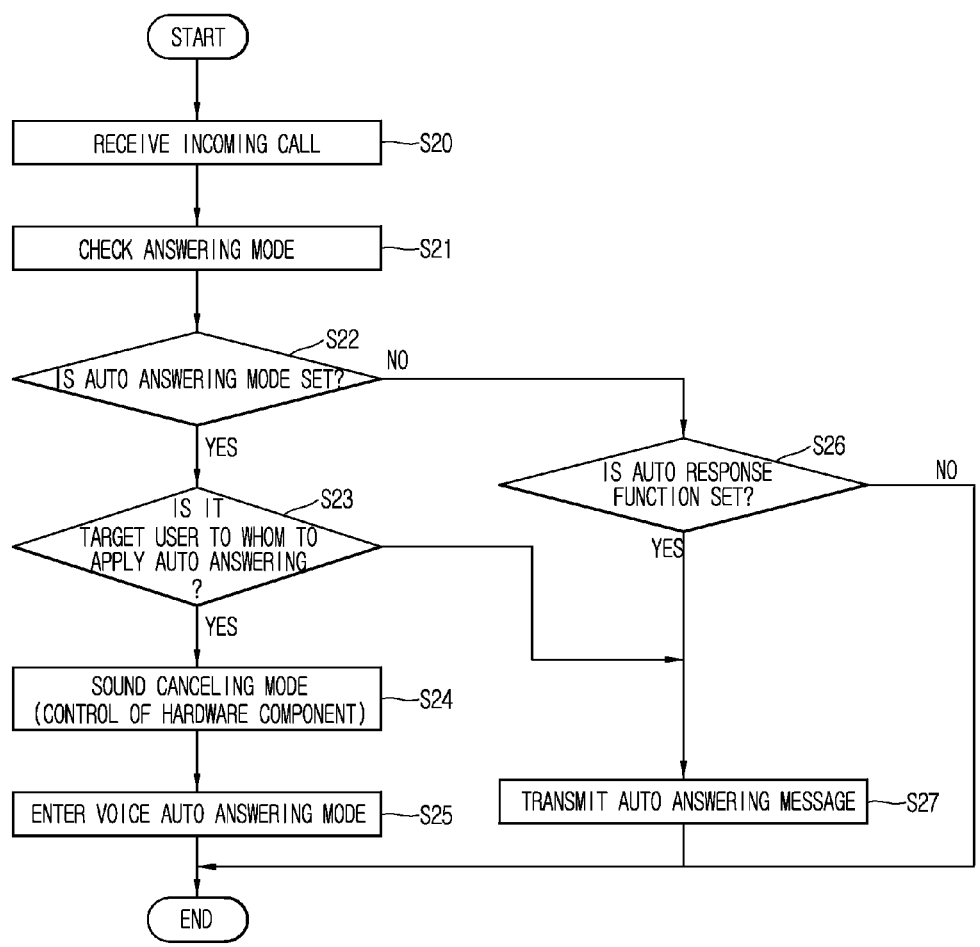
FIG. 12 is a flowchart illustrating an operation of entering a voice auto answering mode when receiving an incoming call according to another embodiment of the present invention.

FIG. 12 is a flowchart illustrating an operation of entering the voice auto answering mode when receiving an incoming call according to an embodiment of the present invention.

As illustrated in FIG. 12, when an incoming call is received (S20) from another party through the wireless communication unit 110 and the incoming call is not answered by the user, the controller 180 determines that the user is not available to answer incoming calls and checks the pre-set answering mode (S21).

If it is determined that the auto answering mode is set (S22), the controller 180 determines whether the other party is a target user to whom to apply the auto answering function (S23), referring to the pre-stored auto answering setting information. At this time, the controller 180 uses identification information for the other party such as the telephone number, the photograph, the email address, and so on, of the other party, or if the pre-stored identification information is not available, uses the pre-registered voice to determine whether the other party is a target user to whom to apply the auto answering function. In addition, if the identification information for the other party and a registered voice of the other party are all available, they are all matched and associated with each other.

If it is determined that the other party is a target user to whom to apply the auto answering function, the controller 180 controls the hardware components (the speaker and the microphone) to enter a sound canceling mode. At the same time, the controller also activates functions necessary for the auto answering function, such as a recording function and a sound-to-text conversion function. Then, the controller 180 enters the voice auto answering mode (S24 and S25 of FIG. 12). In the sound canceling mode, the auto answering voice is output only to the other party and is not output externally from the mobile terminal. The sound canceling mode refers to a state in which the audio output module (e.g., the speaker) and the microphone 122 in FIG. 1 are all turned off.

By contrast, in a case where an auto response function is set, the controller 180 waits until the incoming call is not answered and thereafter transmits to the other party (counterpart user) an auto response message that the user cannot respond to the call (S26 and S27). Alternatively, in a case where the auto answering mode is set and the other party is not the auto answer target user, the controller 180 transmits to the other party the auto response message that the user cannot respond to the telephone call (S26 and S27).

1-5. Telephone Conversation in the Voice Auto Answering Mode

Figure 13:
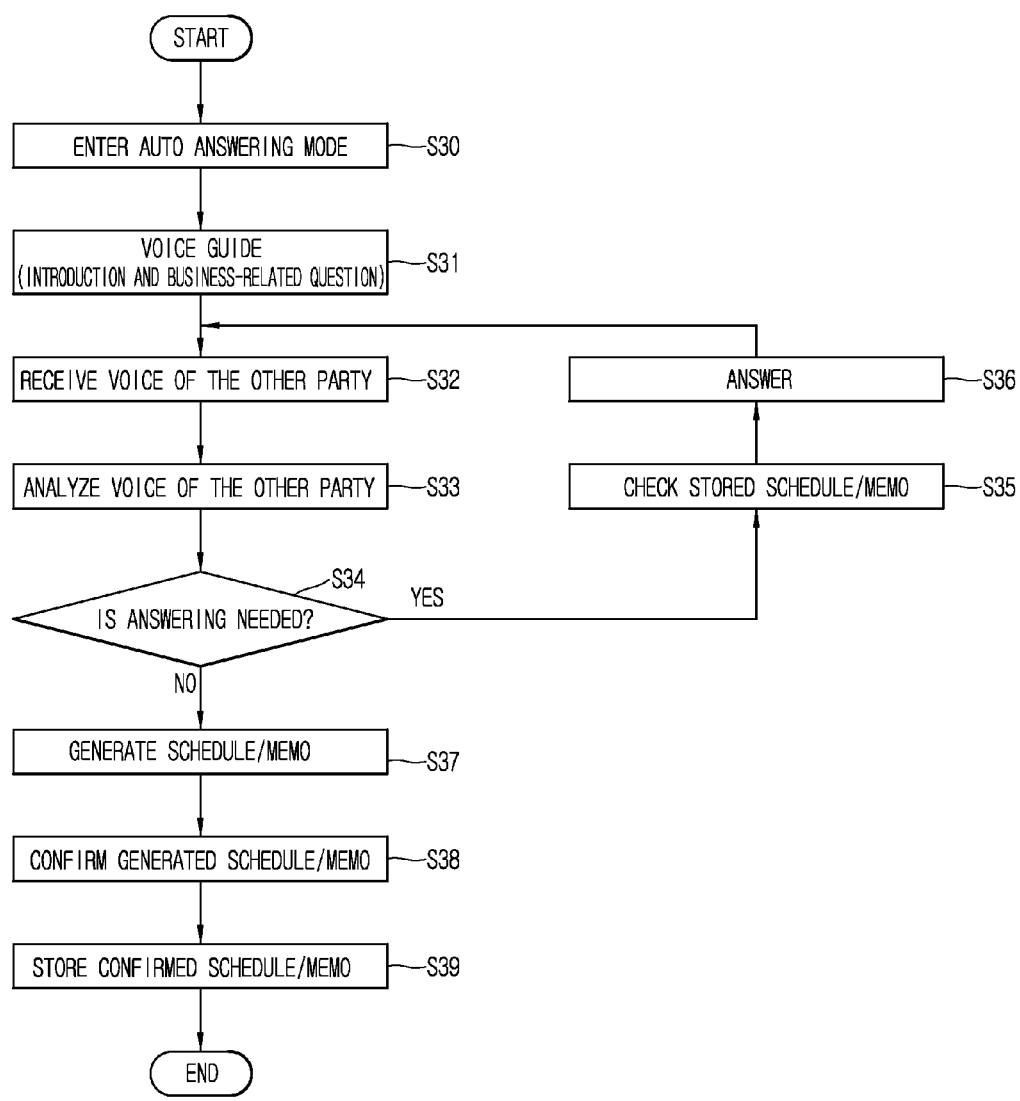
FIG. 13 is a flowchart illustrating an operation of entering the voice auto answering mode and performing auto answering.
Figure 14:
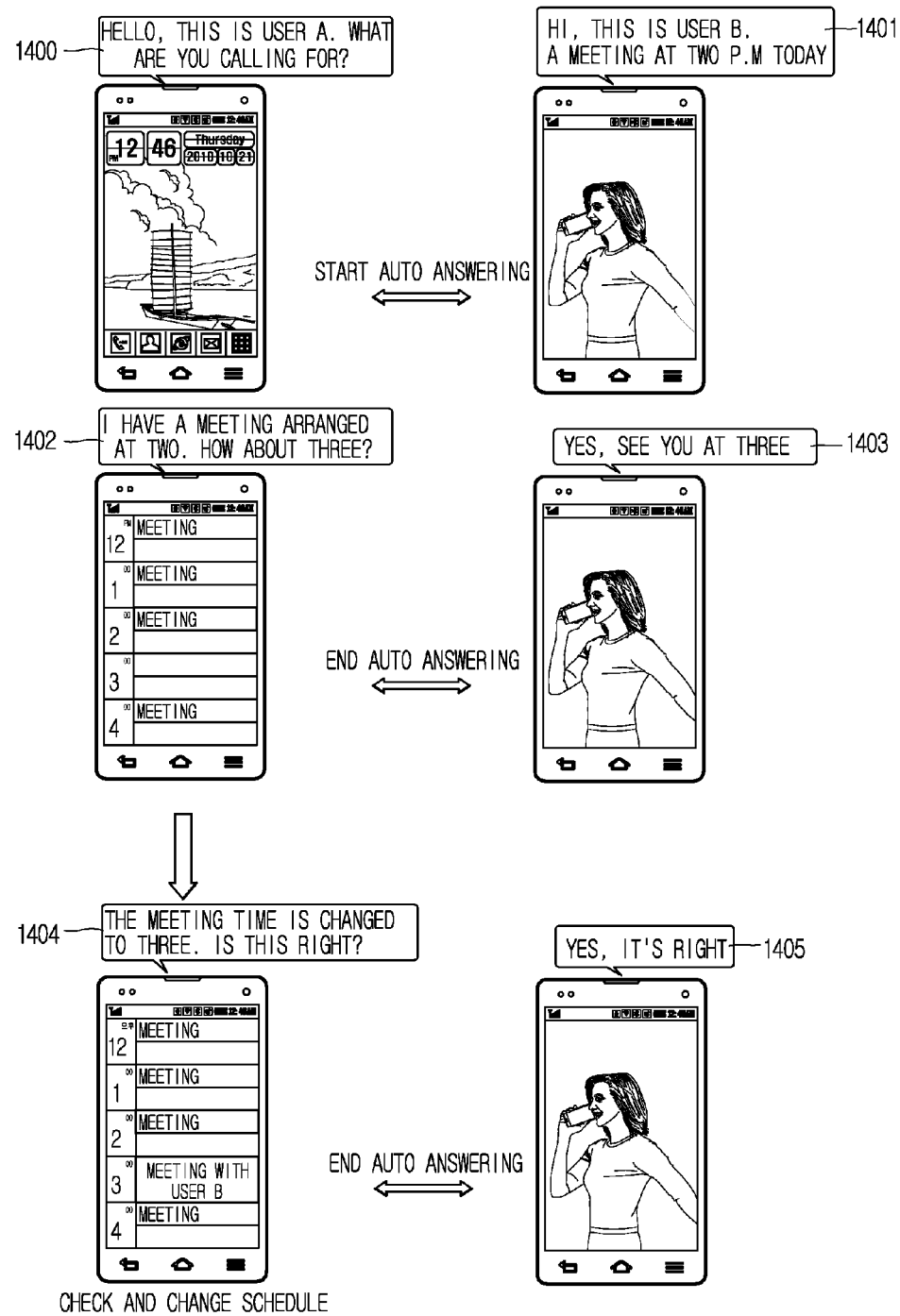
FIG. 14 is a diagram illustrating one example of voice auto answering in FIG. 13.

FIG. 13 is a flowchart illustrating an operation of entering the voice auto answering mode and performing the auto answering function. FIG. 14 is a diagram illustrating one example of the voice auto answering function in FIG. 13.

As illustrated in FIG. 13, when the auto answering function is set and a call is received from another user who is a target user to whom to apply the auto answering function, the controller 180 enters the voice auto answering mode (S30).

Once the controller 180 enters the voice auto answering mode, the controller 180 provides a voice guide (S31) to the other party according to the user's talking style and speech pattern using the auto answering information and settings.

The voice guide (S31) includes an introduction and a question associated with a matter of business, such as "HI, THIS IS USER A. MAY I ASK WHAT YOU ARE CALLING FOR?" 1400 illustrated in FIG. 14. That is, the controller 180 outputs the voice communication in the same voice as that of the user according to the speech pattern and the vocabulary that were obtained by analyzing the content of the previous voice telephone conversations, or according to a speech pattern pre-set by the user.

Referring to FIG. 13, when the voice of the other party responding to the introduction and the question is received (S32), the controller 180 analyzes the response (S33) of the other party and checks whether a response is necessary (S34). The meaning of the response is extracted word by word or phrase by phrase from the natural language transmitted by the other user through the use of a context awareness method. The context awareness is performed by the controller 180. The server may also be requested to perform the context awareness for the analysis of the content of the conversation.

A case where the response to the other party is determined as being necessary includes, for example, a request for confirmation, as well as a proposal associated with a given issue, such as "I WANT TO HAVE A MEETING AT TWO P.M TODAY. ARE YOU AVAILABLE THEN?" (1401 of FIG. 14).

If it is determined that the response of the other party has to be responded to, the controller 180 checks the user's schedule and memo files and searches for information associated with the proposal or request of the other party to formulate a response (S35 and S36). As illustrated in FIG. 14, the controller 180 may answer as follows: "I HAVE A MEETING ARRANGED AT TWO. HOW ABOUT THREE?" (1402 of FIG. 14).

After receiving an additional voice response from the other party, such as "OK, SEE YOU AT THREE" (1403 of FIG. 14), the controller 180 repeatedly performs Steps S32 and S33 of FIG. 13.

Thereafter, if the telephone conversation is ended, or if auto answering is no longer needed, the controller 180 generates a new schedule item or creates a memo item to be delivered to the user, based on the content of the telephone conversation with the other party and then receives confirmation from the other party (S37 and S38) with respect to the created item details. For example, an answering message for confirmation may include information about a summarized schedule or a created memo such as "MEETING TIME IS CHANGED TO THREE. IS THIS RIGHT?" (1404 of FIG. 14).

When the other party confirms the details of the schedule or the memo ("YES, IT'S RIGHT", 1405 of FIG. 14), the controller 180 stores the created (or changed) schedule item or memo item in a personal information manager (PIM) and stores the schedule or memo item in a separate region of the memory 160 (S39 of FIG. 13). The created schedule or memo item may be stored in its entirety or a summarized version may be stored. The storage type of the created schedule or memo item may be voice, text, or both.

When the voice auto answering process is complete, the controller 180 changes a color of an auto answering icon 80 displayed on a status information region on the upper portion of the screen, thereby indicating that the auto answering process has taken place and is complete. Then, the controller 180 may switch back to a sleep mode to save battery power.

Thereafter, when the user cancels the sleep mode, the pre-stored content of the conversation and the changed content of the schedule or memo item are displayed according to a pre-set display type. When the auto answering icon 50 is selected, the content of the conversation is output in the form of voice audio. Additionally, if a meeting time is changed, the changed meeting time can be automatically notified to all the users who will participate in the meeting if the user has set the auto answering information to be available to the public.

1-6. Outputting the Content of a Telephone Conversation

Figure 15:
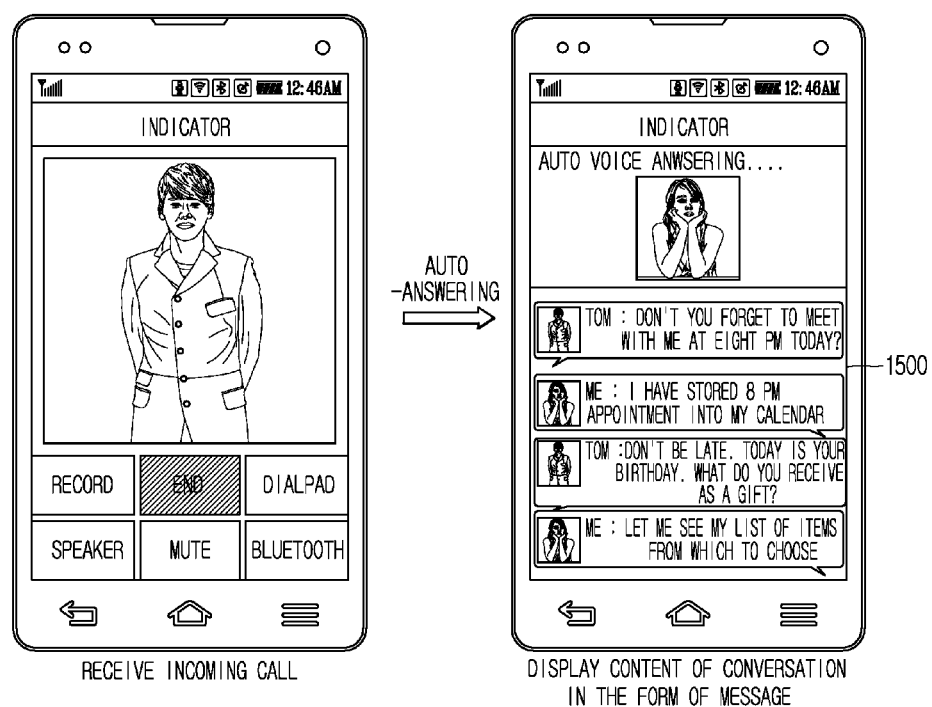
FIG. 15 is a diagram illustrating an example in which content of the conversation is displayed on a screen in the form of letters at the time of the voice auto answering.

FIG. 15 is a diagram illustrating an example in which the content of a conversation during the auto answering process is displayed on a screen in the form of text.

As illustrated in FIG. 15, the controller 180 displays the content of the auto answering conversation with the other party in the form of messages displayed as text 1500, and the displayed content is also stored in the memory 180 when the conversation is complete.

Figure 16:
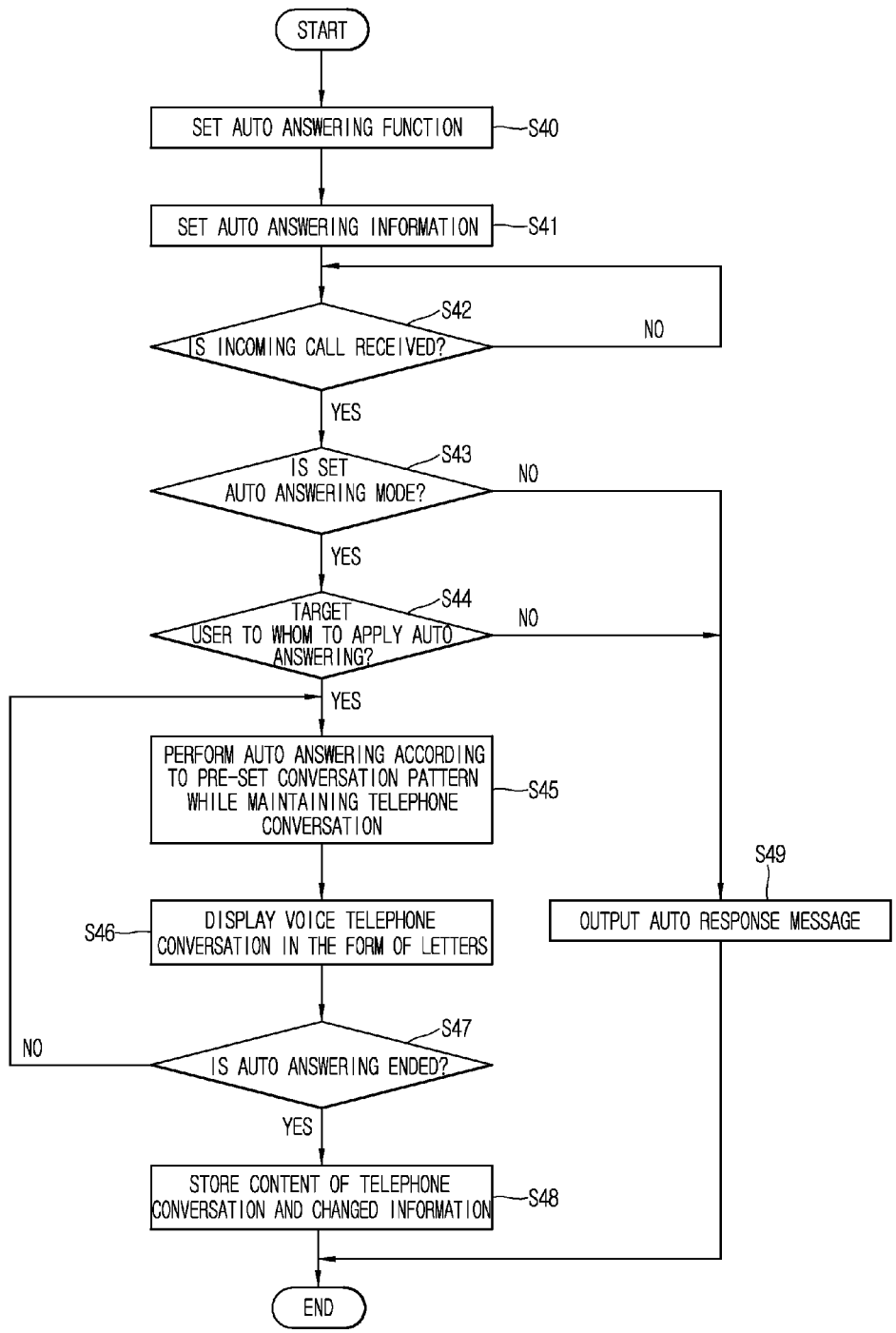
FIG. 16 is a flowchart illustrating an auto answering method for use in the mobile terminal according to an embodiment of the present invention.

FIG. 16 is a flowchart illustrating an auto answering method for use in the mobile terminal according to an embodiment of the present invention.

As illustrated in FIG. 16, the user sets the auto answering function S40 from the auto answering menu (such as the embodiment illustrated in FIG. 3) or sets the auto answering function using voice commands. To that end, the controller 180 displays the auto answering menu stored in the memory 160 on the display unit 151 (not depicted) according to the input by the user and recognizes the input of the user's voice using the voice recognition function (not depicted).

Thereafter, the controller 180 sets the auto answering information (S41), such as a target user (e.g., a friend, a family member, or other users), a time to auto answer each event, a display type, a speech pattern (a talking style and a vocabulary), and settings related to availability to the public. If the user sets only the auto answering function and does not set the detailed auto answering information, the detailed auto answering information is set to default values.

The controller 180 stores all the information in the memory 160. The controller 180 displays the auto answering icon 80 (referring to the embodiment of FIG. 10) on the status information display region of the screen and thus indicates that the auto answering function is currently set. The auto answering icon 80 differs in color when the auto answering process is in progress and when the auto answering process is complete. The user can check the auto answering information that is set, by selecting the auto answering icon 80.

In a state where the auto answering function and the auto answering information are set as described above, a situation can occur in which the user attends a meeting or is otherwise away from the mobile terminal, so that the user cannot respond to an incoming telephone call. The user can input a short memo using a memo function when setting the auto answering function. The memo is input using text characters and voice input. The memo may include information that is not included in the personal information management (PIM) and is used later as a reference when the auto answering process is performed.

Thereafter, when an incoming telephone call arrives from another party (S42), the controller 180 may check if the auto answering function is set (S43). When the auto answering function is confirmed as being set, the controller 180 determines whether the other party initiating the incoming telephone call is a target user for whom to apply the auto answering function by referring to the auto answering information (S44).

If the other party is a target user, the controller 180 causes the mobile terminal to enter a sound canceling mode. Then, referring to the user's schedule information stored in the PIM or the memo stored in the memory 160, the controller 180 asks a question to the other party, such as "What is the purpose of your call?" or offers a proposal while maintaining the telephone conversation (S45) with the other party. At this time, the controller 180 changes the color of the auto answering icon to indicate that the auto answering process is currently in progress. The controller 180 extracts the text of the conversation word by word or phrase by phrase from the natural language of the other party through the use of the context awareness method to determine the content of the telephone conversation. The context awareness may be performed by the controller 180. The server may also be requested to perform the context awareness for the analysis of the content of the conversation.

While the auto answering process is in progress, the controller 180 displays the content of the conversation (the content of the voice telephone conversation) as illustrated in the embodiment of FIG. 14 and at the same time, performs voice recording (S46). When the voice telephone conversation is complete (S47), the content of the telephone conversation and any information changed during the auto answering (e.g., schedule or memo information) are stored in the memory 160 (S48). At the same time, the color of the auto answering icon is again changed to indicate that the auto answering process is complete.

In addition, when a specific schedule item is changed during the auto answering process, the controller 180 checks whether the corresponding schedule item is set as available to the public. If it is available to the public, the controller transmits the changed schedule item to the other users, such as invitees or organizers, associated with the corresponding schedule item.

On the other hand, if the auto answering function is not set when an incoming telephone call is received (S33), or if the auto answering function is set but the user is not an auto answer target user (S44), the controller 180 simply outputs a conventional auto response message (S49).

Figure 17:
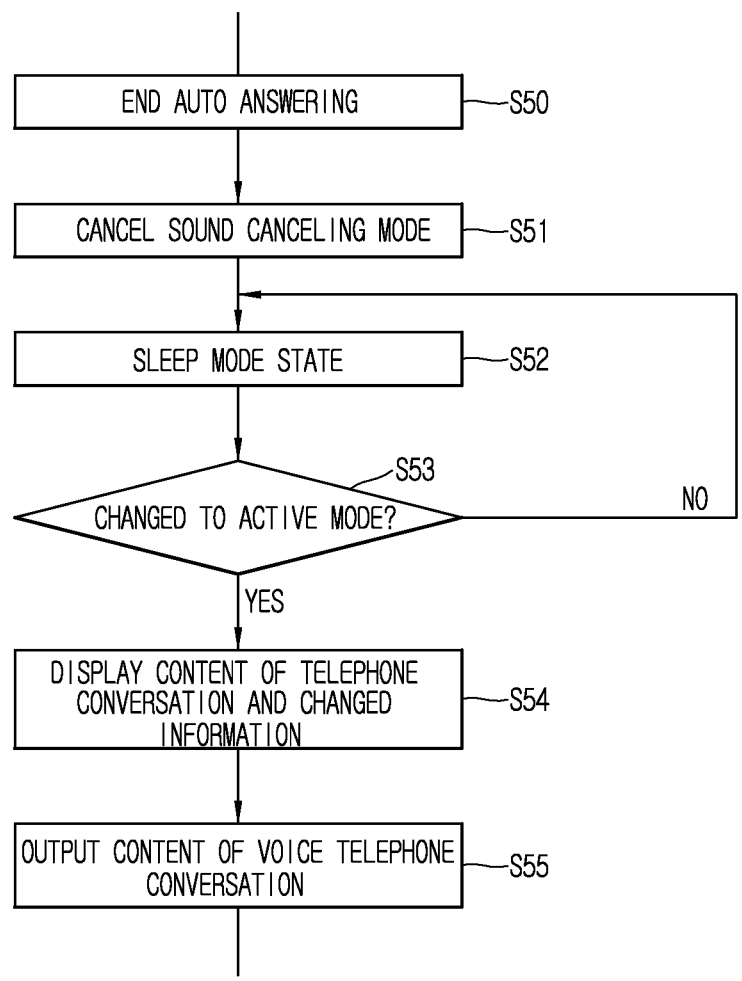
FIG. 17 is a flowchart illustrating a method of outputting the content of the telephone conversation when ending the auto answering according to an embodiment of the present invention.

FIG. 17 is a flowchart illustrating a method of outputting the content of the telephone conversation when the auto answering process is complete.

As illustrated in FIG. 17, when the auto answering process is complete (S50), the controller 180 cancels the sound canceling mode (S51) and stores a summarized version of the content of the telephone conversation and any changed information item (i.e., schedule and memo items) in the memory 160. Then, the controller 180 enters a low electric power state, that is, a sleep mode (S52) in order to reduce power consumption.

Thereafter, when the user cancels the sleep mode using a button or other input, and the mobile terminal is changed from the sleep mode to an active mode (S53), the controller 180 displays the content of the telephone conversation stored in the memory 160 in the form of text (as illustrated by the embodiment of FIG. 14) and displays any changed information items or a summarized version of the information on the screen (S54). When the user selects the auto answering icon 80 in this state, the controller 180 outputs the content of the telephone conversation in the form of voice audio (S55).

The mobile terminal with the auto answering function according to an embodiment may be configured to work with networked cloud storage and servers and thus store the content of the telephone conversation, any changed information items (such as schedule and memo items), and the like in the server 200, as illustrated by the embodiment of FIG. 3. For example, when the user leaves his/her mobile terminal behind at a remote location such as the user's home or office, the auto answering function can be remotely set through the use of a telephone call, an internet website, a computer program, or a text, voice, email, or other form of message. If the auto answering function is remotely controlled by a voice command, the controller 180 may perform a comparison on the identification information (such as the telephone number or email address) of the user attempting to remotely set the function, but also on the analyzed speech pattern of the user in the case of a voice command. The authentication may also be performed by requiring a password preset by the user on the mobile terminal. After identifying the user, the controller 180 sets the requested auto answering function. When the auto answering function is set, the auto answering process and functions described above can be performed. Since the auto answering function may be configured to work with the network cloud storage and servers, the content of telephone conversations during the auto answering process and any changed information items may be stored on the network cloud storage and servers, and thus may be available to the user remotely from another mobile terminal or networked computing device. Therefore, another device of the user (a desktop computer, a notebook computer, tablet computer, and so on) may be used to check the content of any telephone conversations that have taken place via the auto answering function, and the details of any changed information items.

The auto answering function according to an embodiment of the present invention can be applied to a case where the incoming event is a message instead of an incoming telephone call. In this case, the controller 180 performs the auto answering process in the form of a text based message, based on the set auto answering information. In addition, if the event is an SNS message, the auto answering process is performed in a similar way as auto answering in response to receiving an incoming call, except that the conversation takes place in the form of text based messages exchanged with the other party.

In addition, the content of a telephone conversation, which is displayed on the screen during the auto answering process, may be displayed on the mobile terminal of the other party in the same manner as it is on the user's own mobile terminal.

As described above, if a user is unable to respond to an incoming telephone call from another party, the mobile terminal is configured to automatically answer the telephone call using an interactive auto answering function as if it were a personal secretary. The mobile terminal may perform an interactive voice telephone conversation with the other party while maintaining the telephone call. The speech pattern and other characteristics of the user of the mobile terminal are analyzed based on an analysis of the content of previous telephone conversations conducted by the user, and the result of the analysis is stored and utilized when the auto answering function is performed. Thus, the result of the analysis provides an advantage of enabling the other party to feel as if he/she is conducting the telephone conversation with the actual user, instead of an automated machine answering system.

In addition, according to one embodiment of the present invention, the method described above may be realized by being stored as processor-readable codes in a program-stored medium. The computer-readable medium includes all types of recording devices that stores data that are readable by computer systems. A ROM, a RAM, a CD-ROM, a magnetic tape, a floppy disk, an optical data storage device and the like are examples of the computer-readable medium, and the computer-readable medium may be realized in the form of a carrier wave (for example, a transmission over the Internet). In addition, the computer may include a controller of the mobile terminal.

The mobile terminal with the auto answering function described above and the auto answering method for use in the mobile terminal are not applied restrictedly in terms of configuration and manner, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for answering a call at a mobile terminal, the method comprising:
   receiving an incoming call from a calling party;
   answering the incoming call via an auto answering function;
   providing a first audio output to the calling party when the calling party is identified as a target user;
   receiving a first response input from the calling party after providing the first audio output;
   modifying information of a first application of a plurality of applications executable at the mobile terminal based on the first response input, wherein the first application is identified from the plurality of applications based on content of the first response input,
   storing a transcript of an exchange with the calling party during the auto answering function which includes at least the first audio output and the first response input;
   entering a sleep mode when the exchange is complete; and
   displaying the transcript of the exchange and the modified information of the first application when the sleep mode is canceled.

2. The method of claim 1, further comprising identifying the calling party as the target user based on either:
   whether information of the calling party received via a signal of the incoming call is stored as information of the target user at the mobile terminal; or
   whether a voice of the calling party is stored as a voice of the target user at the mobile terminal.

3. The method of claim 1, further comprising identifying which applications of the plurality of applications are permitted to be modified by a target user via the auto answering function.

4. The method of claim 1, wherein the modifying information of the first application comprises creating a new application item of the first application.

5. The method of claim 1, wherein the modifying information of the first application comprises identifying an existing application item of the first application and changing information of the existing application item.

6. The method of claim 1, further comprising:
   providing a second audio output to the calling party;
   receiving a second response input from the calling party after providing the second audio output; and
   repeating the providing of the second audio output and receiving of the second response input operations until the first application is identified based on content of the received second response input.

7. The method of claim 1, wherein:
   the first audio output comprises an auto voice guide to the calling party using a speech pattern of a user of the mobile terminal;
   the auto voice guide includes an introduction and a question; and
   the speech pattern of the user includes at least vocabulary data or speech style data which are compiled from previous telephone conversations and text based messages of the user.

8. The method of claim 7, wherein the user may preset settings for the auto answering function, the settings comprising:
   an event type for which to initiate the auto answering function;
   a target user for whom to initiate the auto answering function;
   a time period during which to initiate the auto answering function;
   a preferred display method of displaying content of an exchange conducted during the auto answering function;
   a privacy setting of the auto answering function; or
   the speech pattern of the user.

9. A mobile terminal comprising:
   a wireless communication unit configured to receive and transmit information;
   a memory unit configured to store information;
   a display unit configured to display information; and
   a controller configured to:
   cause an incoming call to be answered via an auto answering function, the incoming call received by the wireless communication unit from a calling party;
   cause a first audio output to be provided to the calling party when the calling party is identified as a target user;
   receive a first response input from the calling party via the wireless communication unit after the first audio output is provided;
   modify information of a first application of a plurality of applications executable at the mobile terminal based on the first response input, wherein the first application is identified from the plurality of applications based on content of the first response input;
   cause the memory unit to store a transcript of an exchange with the calling party during the auto answering function which includes at least the first audio output and the first response input;
   cause the mobile terminal to enter a sleep mode when exchange is complete; and
   cause the display unit to display the transcript of the exchange and the modified information of the first application when the sleep mode is canceled.

10. The mobile terminal of claim 9, wherein the controller is further configured to identify the calling party as the target user based on either:
   whether information of the calling party received via a signal of the incoming call is stored as information of the target user at the mobile terminal; or
   whether a voice of the calling party is stored as a voice of the target user at the mobile terminal.

11. The mobile terminal of claim 9, wherein the modifying information of the first application comprises causing a new application item of the first application to be created.

12. The mobile terminal of claim 9, wherein the modifying information of the first application comprises identifying an existing application item of the first application and causing information of the existing application item to be changed.

13. The mobile terminal of claim 9, wherein the controller is further configured to:
   cause a second audio output to be provided to the calling party;
   receive a second response input from the calling party via the wireless communication unit after causing the second audio output to be provided; and repeat causing the second audio output to be provided and receiving the second response input until the first application is identified from the plurality of applications based on content of the received second response input.

14. The mobile terminal of claim 9, wherein:

the first audio output comprises an auto voice guide using a speech pattern of a user of the mobile terminal;

the auto voice guide includes an introduction and a question; and the speech pattern of the user includes at least vocabulary data or speech style data which are compiled from previous telephone conversations and text based messages of the user.

15. The mobile terminal of claim 14, wherein the controller is further configured to cause the memory unit to store settings for the auto answering function, the settings comprising:

an event type for which to initiate the auto answering function;

a target user for whom to initiate the auto answering function;

a time period during which to initiate the auto answering function;

a preferred display method of displaying content of an exchange conducted with the initiating party during the auto answering function;

a privacy setting of the auto answering function; or the speech pattern of the user.

* * * * *